H. TENHAM.
EQUALIZING DRIVE MECHANISM.
APPLICATION FILED MAR. 12, 1910.
993,472.
Patented May 30, 1911.
3 SHEETS—SHEET 1.
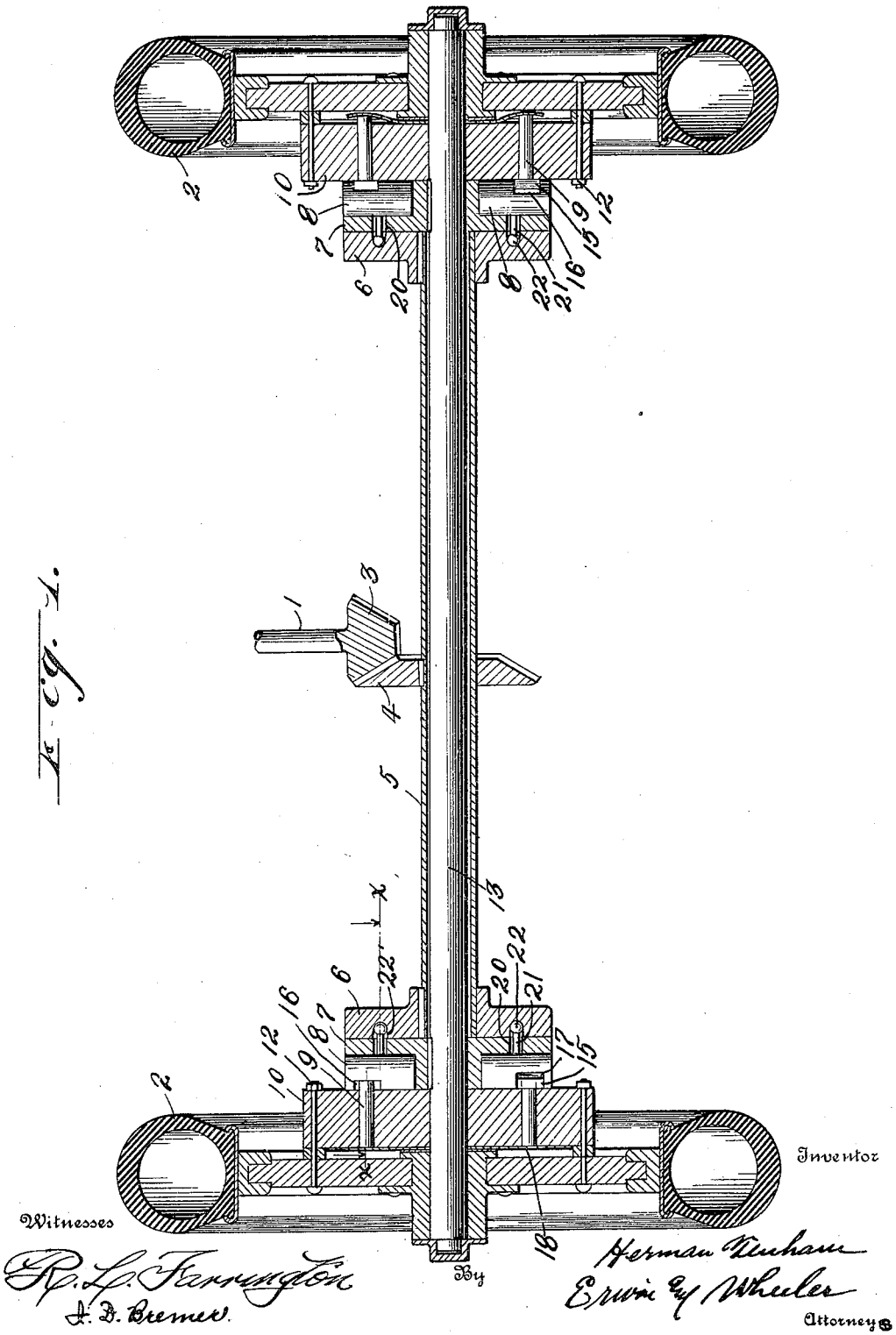
Fig. 1.

H. TENHAM.
EQUALIZING DRIVE MECHANISM.
APPLICATION FILED MAR. 12, 1910.

993,472.

Patented May 30, 1911.
3 SHEETS—SHEET 2.

Witnesses
R. L. Farrington
J. D. Bremer

Inventor
Herman Tenham
By Erwin & Wheeler
Attorneys

H. TENHAM.
EQUALIZING DRIVE MECHANISM.
APPLICATION FILED MAR. 12, 1910.
993,472.
Patented May 30, 1911
3 SHEETS—SHEET 3.
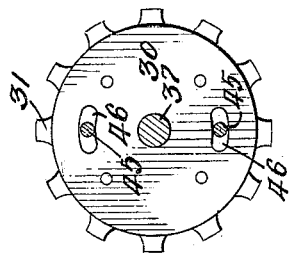
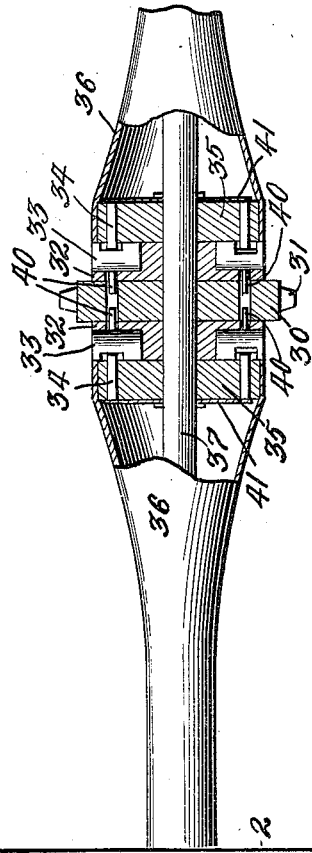
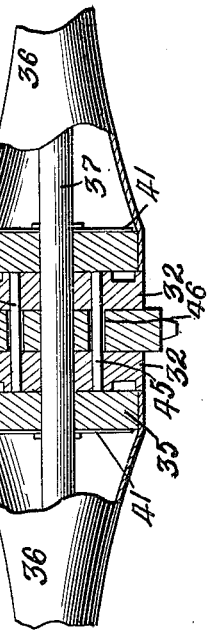
Witnesses
R. L. Farrington
J. D. Bremer
Inventor
Herman Tenham
By Erwin & Wheeler
Attorneys

UNITED STATES PATENT OFFICE.

HERMAN TENHAM, OF BRANDON, WISCONSIN.

EQUALIZING DRIVE MECHANISM.

993,472. Specification of Letters Patent. Patented May 30, 1911.

Application filed March 12, 1910. Serial No. 548,817.

*To all whom it may concern:*

Be it known that I, HERMAN TENHAM, a citizen of the United States, residing at Brandon, county of Fond du Lac, and State of Wisconsin, have invented new and useful Improvements in Equalizing Drive Mechanisms, of which the following is a specification.

My invention relates to improvements in equalizing drive mechanism for motor driven vehicles.

The object of my invention is to provide a substitute for the ordinary differential gear in which the speed of the wheel, to which the tractive force is applied, will always correspond with that of the transmission shaft or chain, a differential movement in the respective wheels being provided for by allowing one wheel to turn faster than it would be turned if the power of the engine were the only factor to be considered. In the ordinary differential gear driving mechanism, when the vehicle turns a corner, the motion of one of the wheels is accelerated and the motion of the other correspondingly retarded, whereas by my improved mechanism, an acceleration only is permitted.

A further object of my invention is to provide a form of construction in which the speed of the vehicle will not be permitted to exceed the speed transmitted from the engine, whereby the motion of the vehicle can be controlled on down grades without applying the brake, or checked on any kind of a grade by slowing down the engine without applying the brake, the means for thus regulating the speed of the vehicle in accordance with that transmitted from the engine being entirely automatic.

In the following description, reference is had to the accompanying drawings, in which—

Figure 2:
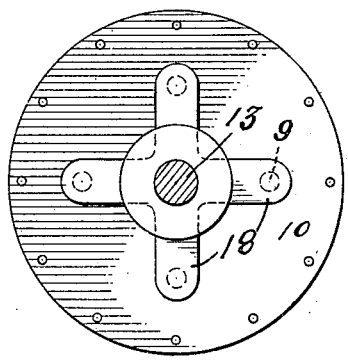
Figure 3:
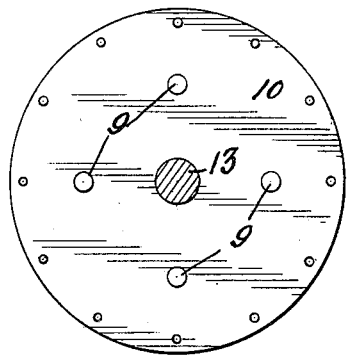
Figure 4:
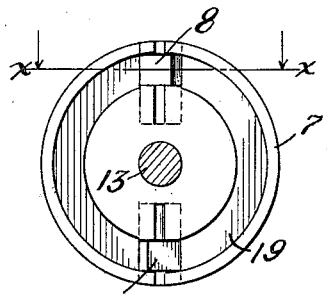
Figure 5:
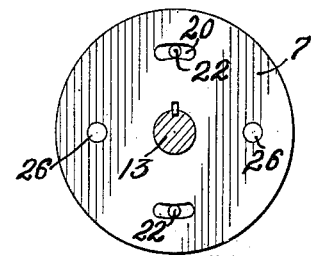
Figure 6:
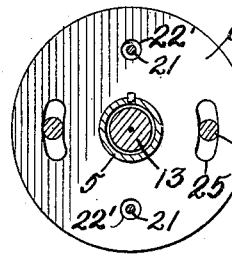
Figure 7:
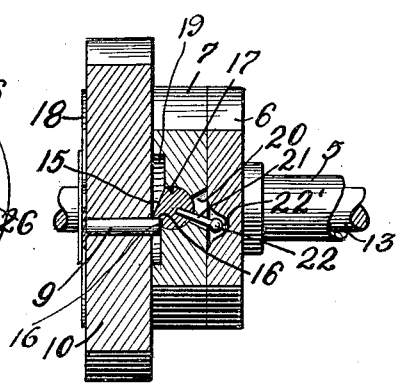
Figure 8:
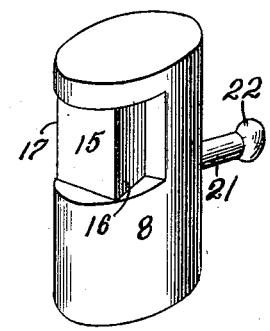

Figure 1 is a horizontal sectional view of the rear axle and wheels of a motor driven vehicle, showing also a portion of the driving mechanism with my invention embodied therein. Fig. 2 is a view of the outer face of one of the outer or driven clutch members. Fig. 3 is a view of the inner face of said member. Fig. 4 is a view of the outer face of the driving clutch member. Fig. 5 is a view of the inner face of the same. Fig. 6 is a view of the outer face of the clutch setting member. Fig. 7 is a sectional view, drawn on line *x—x* of Fig. 1. Fig. 8 is a detail view of one of the gripping members of the clutch. Fig. 9 is a detail view, part in axial section, showing one of the traction wheels and driving mechanism therefor, embodying my invention in a modified form, the portion illustrated in section being drawn to a plane exposing the gripping members of the clutches. Fig. 10 is a detail view of said driving mechanism in section, drawn to a plane exposing the connecting pins uniting the driven members of the clutch. Fig. 11 is a side view of the clutch setting member, which also serves as a driving member for the rear axle.

Like parts are identified by the same reference characters throughout the several views.

The motion of the transmission shaft 1 is transmitted to each vehicle wheel 2 through the beveled gear wheels 3 and 4, sleeve 5, a clutch setting member 6 on each end of the sleeve, driving clutch members 7, gripping members 8, clutch pins 9 and driven clutch member 10, the latter being secured to the vehicle wheel by bolts 12. The clutch setting members 6 are keyed or otherwise secured to the sleeve 5 so as to rotate with it. The driving clutch members 7 are secured to an axle shaft 13, so as to rotate therewith. The driven clutch member 10 and the wheel 2 are loose upon the axle 13 and are either permitted to rotate independently or are driven from the clutch members 7 through the gripping members 8 engaging the pins 9 mounted in member 10, when such gripping members are in a position to so engage the pins. Each of these gripping members 8 is preferably cylindrical in form in its body portion and is socketed to oscillate in the member 7. The outer face of each gripping member 8 is flattened at 15 and notched at 16 and 17 on the respective sides of the flattened portion. The pins 9 in the driven member 10 are axially movable in said member and are located to register with the flattened and notched portions of the gripping members 8. Springs 18 mounted upon the outer faces of the members 10 are adapted to push the pins inwardly to engage in the notches 16, (or 17), of the gripping members, when such members are oscillated to bring one of the notches into a position to receive one of the pins 9, as shown in Fig. 7.

When the parts are in the position illustrated in Fig. 7, if the member 7 is rotated toward the projecting end of the pin 9 with which said gripping member is in contact, it is obvious that motion will be transmitted from the member 7 to the member 10 through the gripping member and pin, but if the member 7 is rotated in the opposite direction, the gripping member 8 will be carried away from the pin and no motion will then be transmitted for the projecting end of the pin will then be received in the annular channel 19 in the member 7, as shown in Fig. 4. A continued rotation of the member 7 in the direction last assumed will cause said gripping member, or one of the other gripping members upon the member 7, to rotate into contact with the pin, but in such case, only the diagonal face 15 will engage the end of the pin, for the notched portion 17 of the gripping member is withdrawn from the path of the pin. The face 15 by moving upon the pin with a wedging action, pushes the pin backwardly against the pressure of its corresponding spring 18 until the pin passes across the angular face 15 and again enters the channel 19 on the other side of the gripping member. These gripping members are therefore one way gripping members in the sense that they will engage the pins and transmit motion from the members 7 to the members 10 in one direction only. The direction of motion transmission may, however, be reversed by oscillating the gripping members 8, so as to bring the notches 17 into position for registry with the pins, the character of such oscillatory movement being clearly indicated in Fig. 7 by the form of an opening 20 in the inner face of the member 7 through which a controlling pin 21 extends and is socketed loosely in the outer face of the clutch setting member 6. These sockets are each preferably formed to receive a spherical head 22 on the pin 21.

Referring to Fig. 6, it will be observed that in addition to the sockets 22′, the outer face of the clutch setting member 6 is provided with segmental channels 25, in which pins 26 rigidly connected with the members 7, are loosely engaged. These pins permit a limited movement of the member 6 rotatively upon the member 7, which movement will be sufficient to move the pins 21 from one side to the other of the opening 20 in the member 7, and thus oscillate the gripping members 8 to the two positions above mentioned. It will therefore be obvious that when motion is communicated from the shaft 1 to the sleeve 5, it will first rotate the clutch setting member 6 upon the member 7 until the pins 26 each engage one end wall of the segmental channel 25, in which such pin is entered. Motion will then be transmitted to the member 7 and the gripping members 8 in said members 7 will have been oscillated to a position to engage the pins 9 in notches 17 for motion transmission in that direction, and upon so engaging pins 9, the sleeve 5, together with the members 6, 7 and 10, together with the wheel 2 will all revolve as if rigidly connected. If for any reason, however, the wheel 2 should be required to revolve faster than the member 7, it is free to do so, since its increased speed of revolution will merely cause the pins 9 to move away from the gripping members 8 and travel in the circular channels 19, the pins being pushed outwardly and traveling freely over the gripping members 8, since they approach them from the opposite side and strike the inclined face 15. Assuming now that the motion of the transmission shaft 1 be checked or reversed, the first effect of such change in speed or direction of movement, will be a rotative shifting of the member 6 upon the member 7, until the pins 26 engage the other ends of the segmental channels 25. This shifting movement will actuate the pins 21 and oscillate the gripping members 8 to the opposite position from that illustrated in Fig. 7, whereupon a continued rotation of the wheel 2 at the same speed and in the same direction as formerly, will bring the pins 9 into engagement with the notches 17 on the opposite side of the respective gripping members from that shown in engagement with the pins in Fig. 7. It will therefore be clear that the motion of both wheels will not be permitted to simultaneously exceed the speed of the motor, for in such event, the member 6 would necessarily shift rotatively and set the gripping members in a position for backward transmission, in which case the pins 9 engage in the notches 17, and the wheels can then turn forwardly with the same speed as the driving clutch members 7, but no faster. In case the motion of the transmission shaft is reversed, the wheels will be compelled to turn backwardly. It will be further observed that it is not possible for an accelerated speed of one of the wheels to reverse the gripping members 8 pertaining to that wheel alone. This is owing to the fact that both of the members 7 are keyed to the axle 13, while the members 6 are keyed to the sleeve 5, so that if one wheel is receiving power from the engine, the sleeve 5 and axle 13 will necessarily revolve at the same speed through the operation of the members 6 and 7 on the side which is receiving the power of the engine. This will therefore prevent any relative backward movement of the member 7 with reference to the member 6 on the opposite side of the vehicle, since the only tendency to such backward movement would be the frictional action of the member 10, (and the pins 9), upon the member 7 and the gripping members 8.

Referring to Figs. 9, 10 and 11, it will be observed that clutch members similar to those above described, are located substantially at the center of the axle. A central member 30 receives power from the engine in any suitable manner, as for example, through sprocket teeth 31. This member 30 operates as a clutch setting or controlling member in substantially the same manner as the members 6 in Fig. 1, which transmits power to wheels 2 through driving clutch members 32, gripping members 33, pins 34, driven clutch members 35 and sleeve shafts 36 inclosing a rod or bar 37, which may be termed a floating or a free axle. The gripping members 33 in this construction are provided with pins 40 corresponding in function with the pins 21, shown in Figs. 1 and 7. The pins 34 correspond in function with the pins 9 and are actuated to clutching position by springs 41 similar to the springs 18.

It is not material to my invention in either of the above described forms, whether the power of the motor is communicated to the clutches and wheels through sprocket chains and wheels, or through the beveled gearing 3 and 4, illustrated in Fig. 1, or by any other suitable means. In the construction illustrated in Figs. 9, 10 and 11, however, it is desirable to connect the members 32 rigidly with each other for the same reason that the members 7 are connected with each other by being keyed to the axle 13. I prefer, however, that the members 32 be not keyed to the rod 37 and I therefore connect them by pins 45, which extend through segmental slots 46 in the member 30, said slots being long enough to permit the necessary relative movement of the controlling member 30 for setting the gripping members 33 in their two possible positions of adjustment. It will be understood that said gripping members are similar in all respects to the gripping member illustrated in Fig. 8. The controlling member 30 performs the function of both controlling members 6, shown in Fig. 1, and in fact it may be considered either as a single controlling member or as two controlling members. I do not, however, limit the scope of my invention to any specific form of construction for the controlling members or for the clutch members; nor do I make any election between the specific construction shown in Figs. 9, 10 and 11, and those shown in the other views, the terms and expressions herein used being employed for the purpose of description and not of limitation, and it is not my intention to exclude from the scope of my invention any mechanical equivalents for the construction, or any parts of the construction, shown and described.

Having thus described my invention, what I claim as new, and desire to secure by Letters Patent, is—

1. In a differential clutch mechanism for the traction wheels of motor driven vehicles, the combination with driving mechanism of a set of driving and driven clutch members, one provided with a resiliently mounted projection and the other having an oscillatory cylindrical member socketed therein and adapted to be adjusted to interlock with said projection on either side of the latter, and means connected with the driving mechanism of the vehicle for automatically adjusting said cylindrical member.

2. In a motor driven vehicle, the combination of a supporting axle member, a set of traction wheels journaled thereon, adjustable gripping members connected with the supporting axle member, a tubular driving axle member inclosing the supporting axle member, a loose connection between the tubular axle member and the gripping members adapted to permit a limited independent rotary movement of the axle member, and clutch members connected with the traction wheels and adapted to be engaged by the gripping members for motion transmission in either direction.

3. The combination with the traction wheels of a motor driven vehicle, of power transmitting connections for said wheels, including a driving clutch member for each wheel, a driven clutch member, an adjustable gripping member connected with one of the clutch members, a resiliently movable interlocking device connected with the other clutch member, and means for adjusting the gripping member to positions for engaging the interlocking device on either side thereof.

4. The combination with the traction wheels of a motor driven vehicle, of power transmitting connections for said wheels including a driving clutch member for each wheel, a driven clutch member, an adjustable gripping member connected with one of the clutch members, a resiliently movable interlocking device connected with the other clutch member, and means for adjusting the gripping members to positions for engaging the interlocking device on either side thereof, said adjusting means being automatically controlled by the power transmitting connections in transmitting driving and retarding force through the clutches to the traction wheels.

5. In a motor driven vehicle, the combination of a supporting axle member, a set of traction wheels journaled thereon, adjustable gripping members connected with the supporting axle member, a tubular driving axle member inclosing the supporting axle member, a loose connection between the tubular axle member and the gripping member adapted to permit a limited independent rotary movement of the axle member, and clutch members connected with the traction wheels and adapted to be engaged by the gripping members for motion transmission in either direction, each of said gripping members having shoulders adapted to positively interlock with projections on said clutch members and said clutch members having resilient interlocking projections for engagement with the gripping members.

In testimony whereof I affix my signature in the presence of two witnesses.

HERMAN TENHAM.

Witnesses:
LEVERETT C. WHEELER,
O. R. ERWIN.